(12) United States Patent
Choi et al.

(10) Patent No.: US 8,697,268 B2
(45) Date of Patent: Apr. 15, 2014

(54) SECONDARY BATTERY

(75) Inventors: Kyugil Choi, Yongin-si (KR); Changbum Ahn, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 222 days.

(21) Appl. No.: 13/067,151

(22) Filed: May 12, 2011

(65) Prior Publication Data
US 2012/0003517 A1   Jan. 5, 2012

(30) Foreign Application Priority Data
Jul. 1, 2010   (KR) .................. 10-2010-0063587

(51) Int. Cl.
*H01M 10/50*   (2006.01)
(52) U.S. Cl.
USPC ............................................. 429/62
(58) Field of Classification Search
None
See application file for complete search history.

(56) References Cited

U.S. PATENT DOCUMENTS 4,345,611 A * 8/1982 Ikeda et al. ............... 137/68.29

FOREIGN PATENT DOCUMENTS

| KR | 10-1999-0033375 A | 5/1999 |
| KR | 10 2004-0110535 A | 12/2004 |
| KR | 10-2007-0056492 A | 6/2007 |
| KR | 10-0864694 B1 | 10/2008 |

OTHER PUBLICATIONS

Korean Office Action in KR 10-2010-0063587, dated Aug. 30, 2011 (Choi, et al.).

* cited by examiner

*Primary Examiner* — Cynthia K. Walls
(74) *Attorney, Agent, or Firm* — Lee & Morse, P.C.

(57) ABSTRACT

An embodiment is directed to a secondary battery, including a case adapted to receive an electrode assembly, and a safety unit attached to an inner surface of the case, the safety unit adapted to punch the case when an internal temperature of the case reaches a predetermined temperature or higher.

13 Claims, 4 Drawing Sheets

SECONDARY BATTERY

BACKGROUND

1. Field

Embodiments relate to a secondary battery.

2. Description of the Related Art

In general, a secondary battery refers to a battery which is chargeable and dischargeable. A secondary battery may be widely used for small high-tech electronic devices such as a mobile phone, a personal digital assistant (PDA), and a laptop computer. A lithium ion secondary battery may have an operation voltage of, e.g., 3.6V, which is about 3 times as much as that of a nickel-cadmium battery and a nickel-hydrogen battery generally used for a power source of electronic equipments. Also, since the lithium ion secondary battery has a high energy density per unit weight, use of the lithium ion secondary battery is rapidly increasing. The lithium ion secondary battery may use a lithium-based oxide for an anode active material and a carbon for a cathode active material.

The lithium ion secondary battery is manufactured in various shapes such as a cylinder shape, a polygonal column or prismatic shape, a pouch shape, etc. The pouch-type secondary battery may include an electrode assembly and a pouch-type case receiving the electrode assembly.

SUMMARY

An embodiment is directed to a secondary battery, including a case adapted to receive an electrode assembly, and a safety unit attached to an inner surface of the case, the safety unit adapted to punch the case when an internal temperature of the case reaches a predetermined temperature or higher.

The safety unit may include a deformation part, the deformation part being made of a thermally deformable material and configured to deform at the predetermined temperature or higher, a striking part formed at the deformation part, the striking part having a pointed tip to punch the case when the deformation part deforms, and a support cover formed at the inner surface of the case, the support cover fixing the deformation part and adapted to receive the striking part.

The safety unit may further include a guide part, the guide part being adapted to guide the striking part as the deformation part deforms.

The thermally deformable material may form a thermally deformable element that bends to one side at the predetermined temperature or higher, and the thermally deformable element may include any of a bimetal and a shape memory alloy.

The thermally deformable material may include a thermally deformable polymer that contracts at the predetermined temperature or higher.

The support cover may be made of a heat-resistant material capable of maintaining its shape to at least the predetermined temperature.

The support cover may be attached to the inner surface of the case, and a part of the support cover that is attached to the inner surface of the case may be made of a same material as the inner surface of the case.

The support cover and the inner surface of the case may be attached to each other by a heat bond.

The support cover and the inner surface of the case may be attached to each other by a silicone adhesive.

The case may be a pouch-type case for a pouch-type battery, the electrode assembly may include an electrode tab, and the safety unit may be disposed near the electrode tab on the inner surface of the pouch-type case.

The predetermined temperature may be about 150° C.

Another embodiment is directed to a battery, including a case, an electrode assembly in the case, and a safety unit in the case, the safety unit including a thermally deformable member having an end that is disposed at a first distance from an inner surface of the case, the end creating a hole in the case when the thermally deformable member is heated to a predetermined temperature, the predetermined temperature being higher than a normal operating temperature of the battery.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
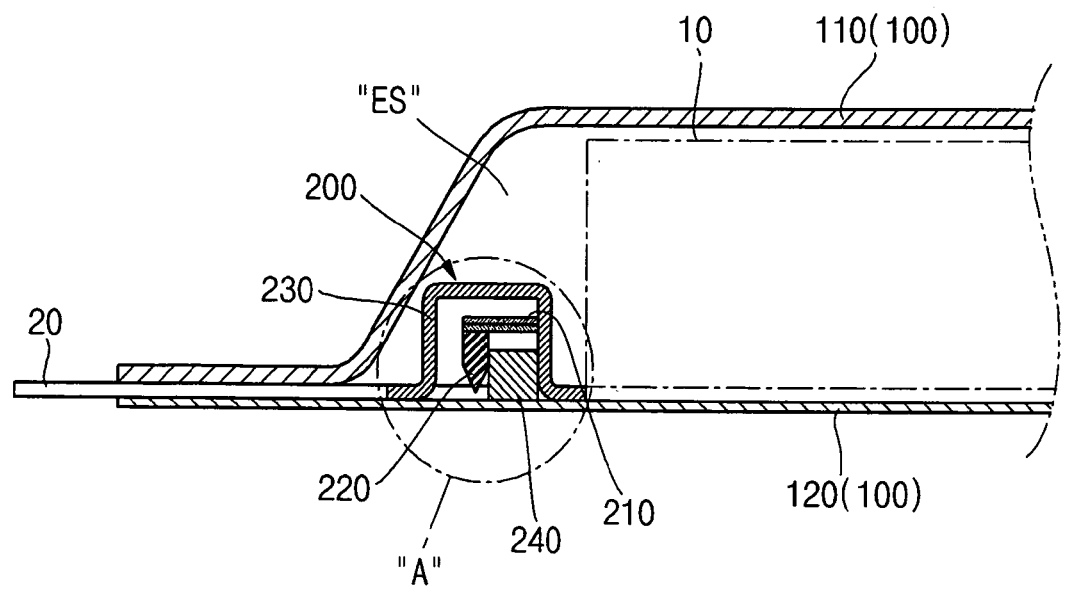
FIG. 1 illustrates a sectional view of a secondary battery according to an example embodiment.

Korean Patent Application No. 10-2010-0063587, filed on Jul. 1, 2010, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a sectional view showing a secondary battery according to an example embodiment.

Referring to FIG. 1, the secondary battery may include a case 100 receiving an electrode assembly 10, and a safety unit 200.

The electrode assembly 10 may serve as a main element for charging and discharging of the secondary battery. The electrode assembly 10 may be constructed with a first electrode plate and a second electrode plate having a separator disposed therebetween. An electrode tab 20 may be provide at one side of the electrode plates, e.g., by extending it from the electrode assembly 10. In an implementation, the safety unit 200 may be within the case 100. In an implementation, the safety unit 200 may be attached near the electrode tab 20.

The case 100 may receive the electrode assembly 10. The case 100 may have a shape such as a cylinder type, a polygonal type, a pouch type, etc. In the present example embodiment, the case 100 will be explained as a pouch type.

The pouch-type case 100 may include an upper case 110 and a lower case 120. The pouch-type case 100 may be constructed by installing the electrode assembly 10 between the upper and the lower cases 110 and 120. The case 100 may be sealed by sealing circumferential edges of the upper and the lower cases 110 and 120. Electrode tabs 20 may be connected to the respective electrode plates to electrically connect the electrode assembly 10 with the outside. The electrode tabs 20 may be exposed out of the case 100 through a sealed part of the case 100. And an electrolyte is injected into the case 100.

The safety unit 200 may be attached to an inner surface of the case 100 and contact with the electrolyte. And the safety unit 200 may be adapted to punch, i.e., perforate, the case 100, thereby generating a hole 101 (refer to FIG. 4) to vent the internal region of the case to the outside when an internal temperature of the case 100 reaches or exceeds a predetermined temperature. By thus forming the hole 101, explosion or bursting of the battery may be prevented at the predetermined temperature or higher.

In an implementation, an empty space ES, not occupied by the electrode assembly 10, may exist near the electrode tab 20, as shown in FIG. 1. The safety unit 200 may be disposed around the electrode tab 20, e.g., on the inner surface of the case 100, to utilize the empty space ES. Thus, the safety unit 200 may be installed without the necessity of enlarging or structurally altering the case 100.

Hereinafter, the safety unit 200 will be more specifically described with reference to FIGS. 2 through 4.

Figure 2:
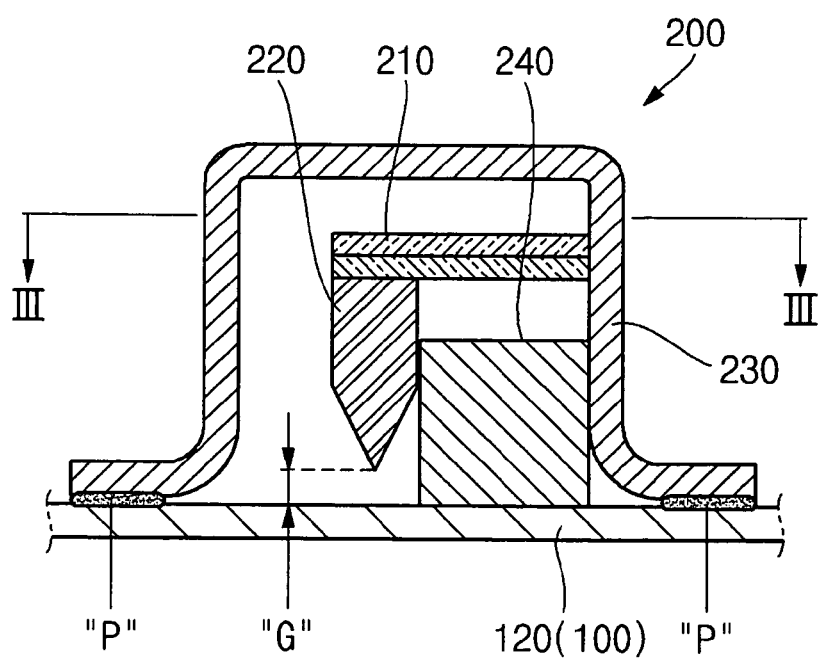
FIG. 2 illustrates a partially enlarged view of a portion "A" of FIG. 1.
Figure 3:
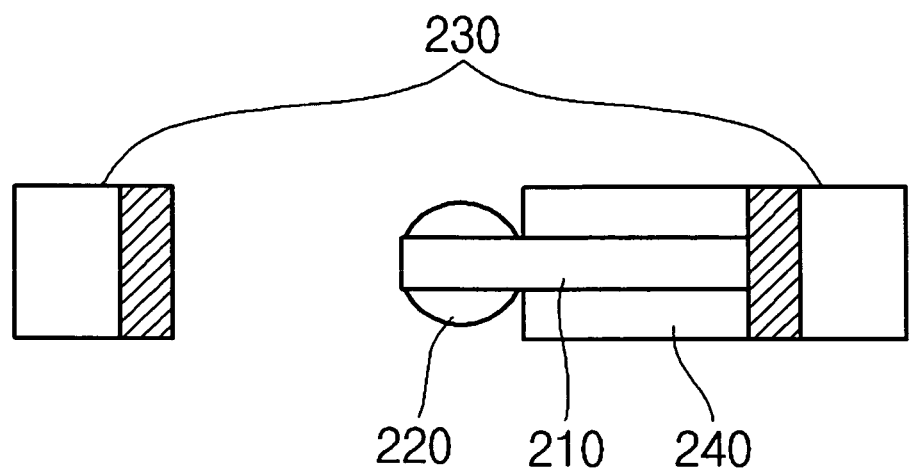
FIG. 3 illustrates a sectional view of FIG. 2, cut along a line III-III.
Figure 4:
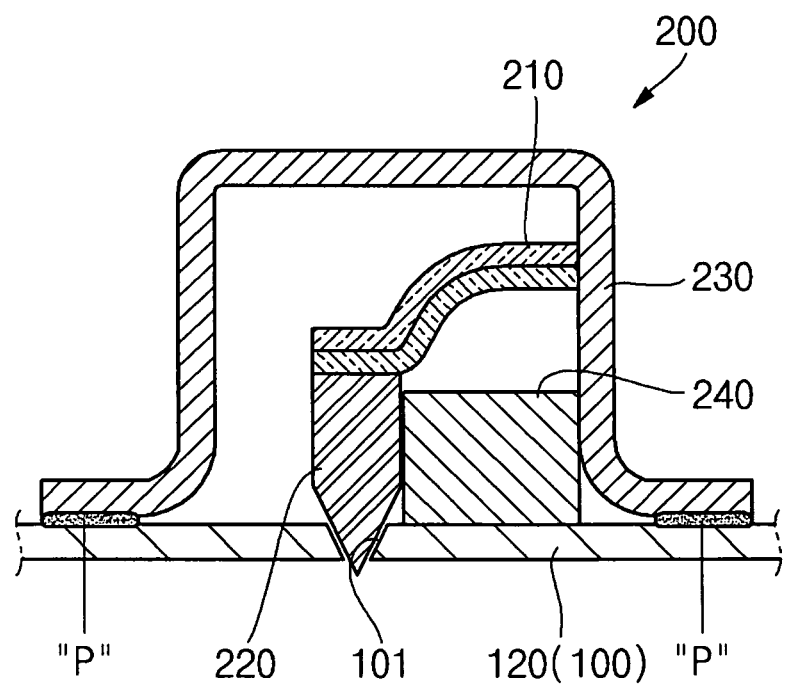
FIG. 4 illustrates a sectional view showing the safety unit of FIG. 2 in operation.

FIG. 2 illustrates a partially enlarged view of a portion "A" of FIG. 1 and FIG. 3 illustrates a sectional view of FIG. 2, cut along a line in FIG. 2. FIG. 4 illustrates a different sectional view of the safety unit of FIG. 2 in operation.

As shown in FIGS. 2 and 3, the safety unit 200 may include a deformation part 210, a striking part 220, and a support cover 230.

The deformation part 210 may be made of, e.g., a thermally deformable material that deforms at the predetermined temperature, which may be, e.g., about 150° C. For example, the deformation part 210 may be a thermally deformable element that bends toward one side when exposed to the predetermined temperature or higher. In an implementation, the deformation part 210 may be a bimetal bar formed by attaching two different types of thin metal plate, having different thermal expansion coefficients, into one sheet. An end of the deformation part 210 may be fixed to the inner surface of the support cover 230.

The striking part 220 may protrude toward the case 100. The striking part 220 may extend from the deformation part 210. The striking part 220 may be fixed to the deformation part 210. Referring to FIG. 4, upon bending of the deformation part 210 at the predetermined temperature or higher, the striking part 220 may pierce the case 100, forming the hole 101 on the case 100. The striking part 220 may have a sharp or pointed tip to efficiently form the hole 101.

The support cover 230 may be fixed to the inner surface of the case 100 such that the striking part 220 and the deformation part 210 are kept at a predetermined gap G from the inner surface of the case 100. The predetermined gap G may help avoid inadvertent piercing or damage of the case 100 during normal operation of the battery. The deformation part 210 may be fixed to an inner surface of the support cover 230. The striking part 220 may be fixed to the deformation part 210 and disposed within the support cover 230.

The support cover 230 may be made of a heat-resistant resin that is not deformed even at the predetermined temperature. This may help ensure that the striking part 220 is kept at the predetermined gap G from the inner surface of the case 100 until the deformation part 210 is thermally activated by the predetermined temperature or higher. For example, cast polypropylene (CPP) or polyethylene terephthalate (PET) may be used as the heat-resistant resin.

In an implementation, the support cover 230, or a part thereof attached to the inner surface of the case 100, may be made of a same resin material as the inner surface of the case 100, e.g., CPP. In this case, the support cover 230 and the inner surface of the case 100 may be attached to each other by heat bonding. Heat bonding may have a great bonding force in comparison with a general adhesive. Thus, the support cover 230 may be substantially integrally formed with the case 100, and the predetermined gap G between the striking part 220 and the inner surface of the case 100 may be more accurately maintained.

In another implementation, the support cover 230 and the inner surface of the case 100 may be attached to each other by a silicone adhesive. The silicone adhesive may provide a smaller bonding force than the heat bonding. However, the bonding process may be simplified when using the silicone adhesive. Therefore, any of the above described bonding methods may be appropriately used. In the drawings, a reference symbol "P" denotes the position of the heat bonding or the silicone adhesive.

In an implementation, the safety unit 200 may further include a guide part 240 adapted to guide the striking part 220. The guide part 240 may guide the striking part 220 to move down vertically as the deformation part 210 is bent. The striking part 220 may be able to more accurately punch a target position on the case 100 under the guidance of the guide part 240.

Figure 5:
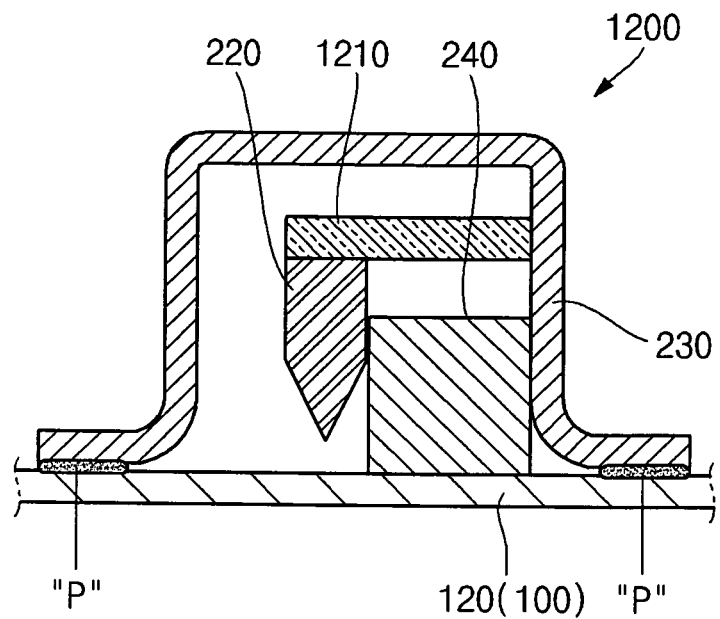
FIG. 5 illustrates a sectional view showing a safety unit of a secondary battery according to another example embodiment.
Figure 6:
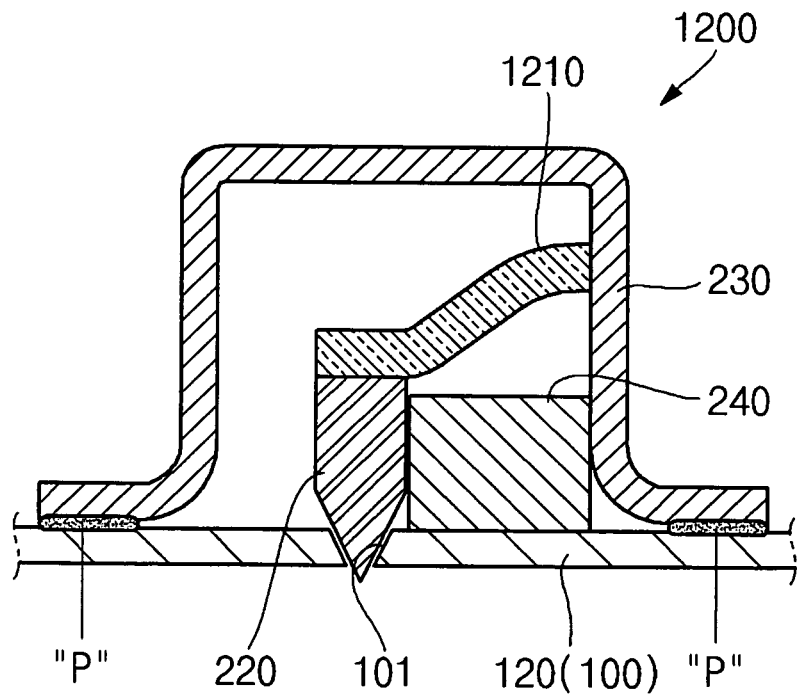
FIG. 6 illustrates a sectional view showing the safety unit of FIG. 5 in operation.

FIG. 5 illustrates a sectional view showing a safety unit of a secondary battery according to another example embodiment, and FIG. 6 illustrates a sectional view showing the safety unit of FIG. 5 in operation.

Referring to FIGS. 5 and 6, the secondary battery according to the present example embodiment may have the same structures as the secondary battery of the previous embodiment, except for a deformation part 1210 of a safety unit 1200. In the following, only the deformation part 1210 of the safety unit 1200 will be described in detail, in order to avoid repetition.

The deformation part 1210 may be made of, e.g., a shape memory alloy that has a first shape at a normal operating temperature of the battery, i.e., below the predetermined temperature, and has a second shape at the predetermined temperature or higher. An end of the deformation part 1210 may be fixed to the inner surface of the support cover 230. As shown in FIG. 6, when the deformation part 1210 is exposed to the predetermined temperature or higher, the deformation part 1210 may bend and punch the case 100, thereby forming the hole 101 in the case 100.

Figure 7:
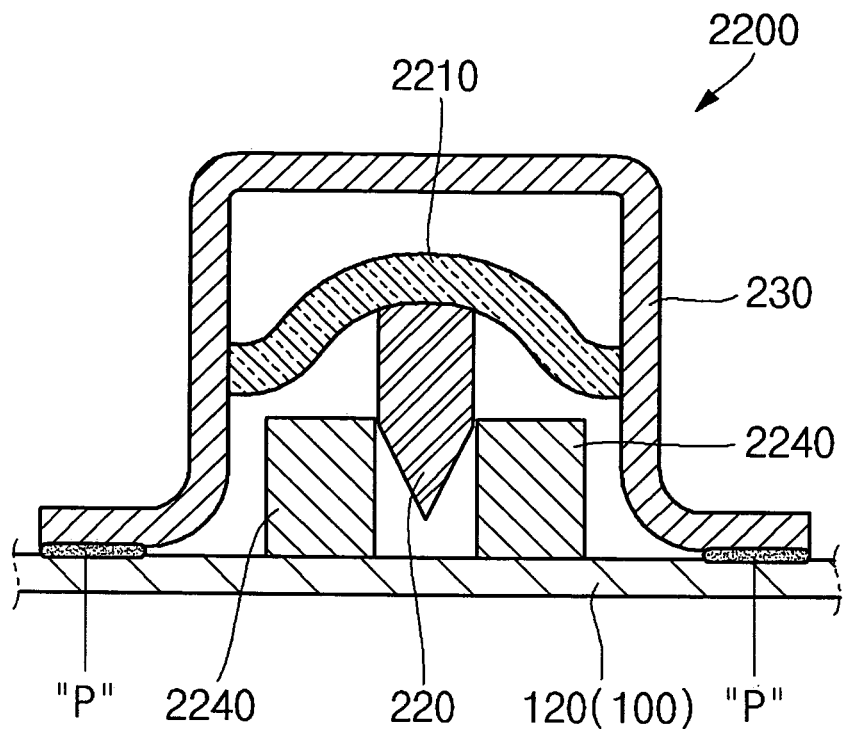
FIG. 7 illustrates a sectional view showing a safety unit of a secondary battery according to a another example embodiment.
Figure 8:
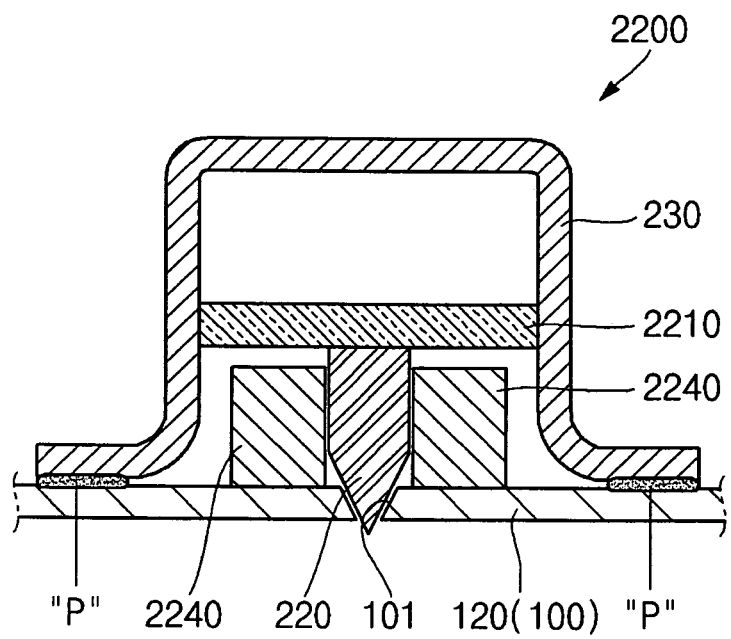
FIG. 8 illustrates a sectional view showing the safety unit of FIG. 7 in operation.

FIG. 7 illustrates a sectional view showing a safety unit of a secondary battery according to another example embodiment, and FIG. 8 illustrates a sectional view showing the safety unit of FIG. 7 in operation.

Referring to FIGS. 7 and 8, the secondary battery according to the present example embodiment may have the same structures as the secondary battery of the previous embodiment, except for a deformation part 2210 and a guide part 2240 of a safety unit 2200. In the following, only the deformation part 2210 and the guide part 2240 will be explained in detail, in order to avoid repetition.

The deformation part 2210 may be made of, e.g., a thermally deformable polymer that contracts at the predetermined temperature or higher. Two ends of the deformation part 2210 may be fixed to sides of the inner surface of the support cover 230, respectively. The striking part 220 may be disposed generally in the middle of the deformation part 2210. As shown in FIG. 8, when the deformation part 2210 contracts at the predetermined temperature or higher, the striking part 2210 may change shape to punch the case 100, thereby forming the hole 101 on the case 100.

Depending on the characteristics of the thermally deformable polymer, the striking part 220 may not be moved down in a sufficiently vertical direction by the deformation part 2210, e.g., it may be inclined to one side. In such a case, the guide part 2240 may be provided, and may a shape surrounding the striking part 220 to prevent the striking part 220 from inclining too much as the deformation part 2210 contracts.

As described above, a secondary battery may provide safety and stability in spite of an increase in internal temperature of a case. According to an example embodiment, the secondary battery may be provided with a safety unit capable of punching a case. Thus, stability of the secondary battery may be secured even though internal temperature increases, and regardless of an internal pressure of the case. In some cases, stability may be better secured by referring to the internal temperature rather than the internal pressure. For example, although the internal pressure increases as the internal temperature of the case increases, the internal pressure may not always increase in direct correspondence with the internal temperature. In other words, the internal temperature of the case may increase in correspondence with an increase in the internal pressure of the case, but may also increase where the internal pressure does not exhibit a corresponding increase. Therefore, it may be desirable to refer to the internal temperature of the case, to be prepared for a situation where only the internal temperature of the case increases.

Also, according to the technology used in the embodiments, the case may be punched based on the internal temperature, rather than being vented only by a sealed part that is split by internal pressure. Therefore, an electrical short caused by a contact between a conductor disposed near the sealed part and an electrode tab may be prevented.

In addition, when the internal temperature of the case reaches the predetermined temperature, the case may be punched without any delay even in a high-capacity storage battery where a great load is applied to the sealed part.

Moreover, the case may be punched regardless of thickness and width of the sealed part. Thus, the operation may be accurately adjusted, and the case may be punched immediately as it reaches the predetermined temperature.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present disclosure as set forth in the following claims.

What is claimed is:

1. A secondary battery, comprising:
a case adapted to receive an electrode assembly; and
a safety unit attached to an inner surface of the case, wherein the safety unit includes:
a deformation part formed of a thermally deformable material that can be deformed according to a change of the temperature of the case, and
a striking part formed at the deformation part, the striking part having a pointed tip to punch the case according to a deformation of the deformation part.

2. The secondary battery as claimed in claim 1, wherein the safety unit further comprises:
a support cover formed at the inner surface of the case, the support cover fixing the deformation part and adapted to receive the striking part.

3. The secondary battery as claimed in claim 2, wherein the safety unit further comprises a guide part, the guide part being adapted to guide the striking part as the deformation part deforms.

4. The secondary battery as claimed in claim 2, wherein:
the thermally deformable material forms a thermally deformable element that bends to one side according to a change in the temperature of the case, and
the thermally deformable element includes any of a bimetal and a shape memory alloy.

5. The secondary battery as claimed in claim 2, wherein the thermally deformable material includes a thermally deformable polymer.

6. The secondary battery as claimed in claim 2, wherein the support cover is made of a heat-resistant material.

7. The secondary battery as claimed in claim 6, wherein:
the support cover is attached to the inner surface of the case, and
a part of the support cover that is attached to the inner surface of the case is made of a same material as the inner surface of the case.

8. The secondary battery as claimed in claim 7, wherein the support cover and the inner surface of the case are attached to each other by a heat bond.

9. The secondary battery as claimed in claim 7, wherein the support cover and the inner surface of the case are attached to each other by a silicone adhesive.

10. The secondary battery as claimed in claim 2, wherein:
the case is a pouch-type case for a pouch-type battery,
the electrode assembly includes an electrode tab, and
the safety unit is disposed near the electrode tab on the inner surface of the pouch-type case.

11. The secondary battery as claimed in claim 1, wherein the deformation part is deformed at a temperature of about 150° C.

12. The secondary battery as claimed in claim 1, further comprising an electrolyte injected into the electrode assembly, and
wherein the safety unit is contacted with the electrolyte.

13. A battery, comprising:
a case;
an electrode assembly in the case; and
a safety unit in the case, the safety unit including a thermally deformable member having an end that is disposed at a first distance from an inner surface of the case, the thermally deformable member being deformed according to a change of the temperature in the case to create a hole in the case.

* * * * *